United States Patent [19]

Johnsen

[11] 3,801,787

[45] Apr. 2, 1974

[54] VALVE FOR RADIATION DETECTION OF LOW PRESSURE IN PNEUMATIC TIRES

[76] Inventor: Erich Cornelius Johnsen, 1205 Board St., Victoria, B.C., Canada

[22] Filed: Jan. 21, 1970

[21] Appl. No.: 4,713

[52] U.S. Cl. .............. 250/388, 73/146.5, 250/430, 250/432, 340/58
[51] Int. Cl. ............................................. G01t 1/19
[58] Field of Search ......... 250/106 R, 83 R, 83.5 R; 340/58; 73/146.5

[56] References Cited
UNITED STATES PATENTS
3,235,726  2/1966  Haller ...................... 250/435 MR Primary Examiner—Walter Stolwein
Assistant Examiner—Morton J. Frome
Attorney, Agent, or Firm—Fleit, Gipple and Jacobson

[57] ABSTRACT

A pressurized attachment for the valve of a pneumatic tire, the attachment housing, in a shielded manner, a small amount of radioactive material. The attachment has a pressure chamber on one end thereof, the other end communicating directly with the pneumatic tire. If the pressure in the tire falls below a predetermined limit, the radioactive material escapes from its shielded housing and flows into the tire. Radioactive emissions then pass through the housing of the tire and are detected by a sensing device. The sensing device is coupled to the instrument panel of the associated vehicle and serves to indicate a leak in the tire.

7 Claims, 12 Drawing Figures

INVENTOR
ERICH C. JOHNSEN

INVENTOR
ERICH C. JOHNSEN

BY Fleit, Gipple & Jacobson
ATTORNEYS

INVENTOR
ERICH C. JOHNSEN

PATENTED APR 2 1974 3,801,787

INVENTOR
ERICH C. JOHNSEN

BY Fleit, Gipple & Jacobson
ATTORNEYS

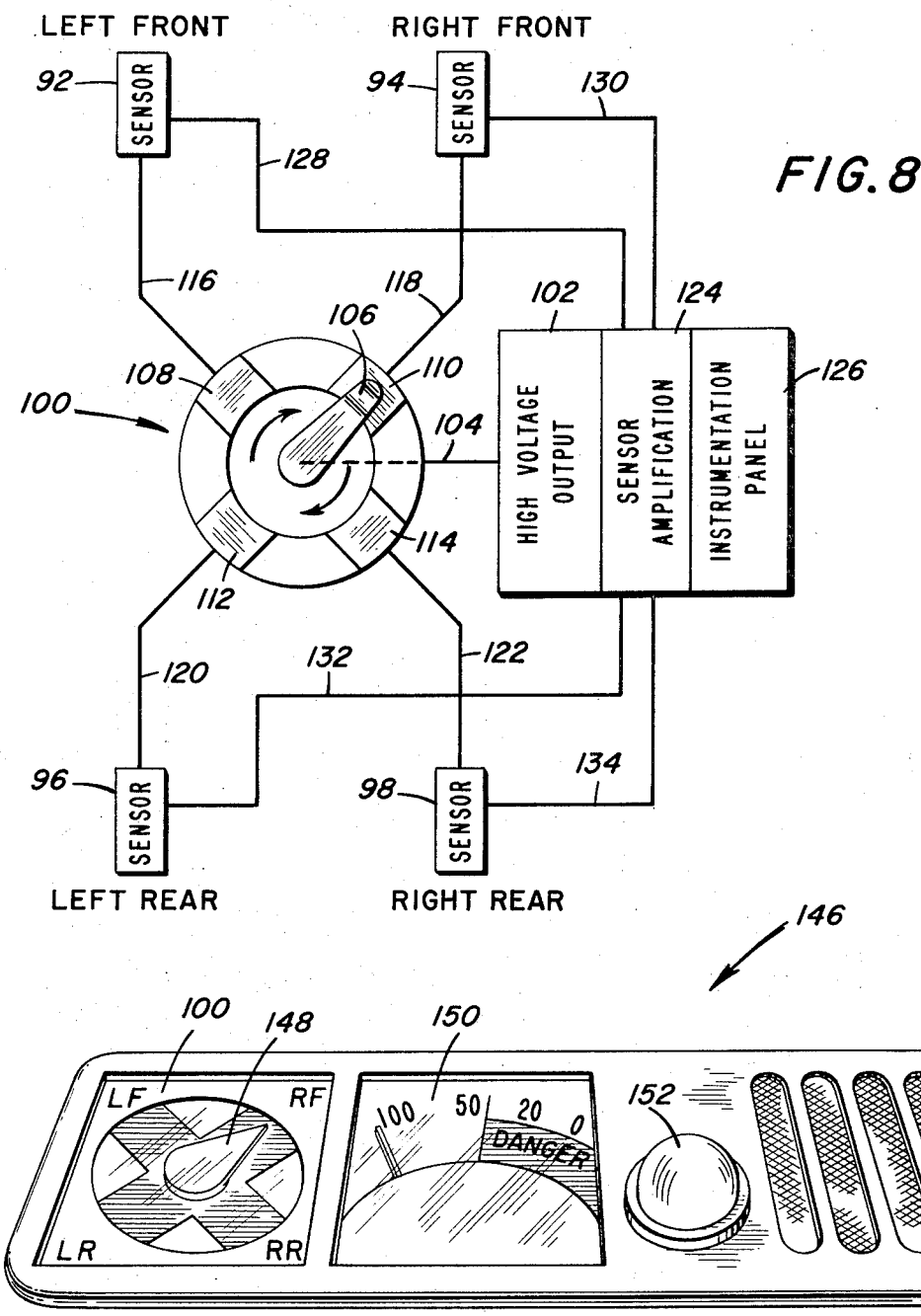

VALVE FOR RADIATION DETECTION OF LOW PRESSURE IN PNEUMATIC TIRES

BACKGROUND OF THE INVENTION

In copending U.S. Patent application, Ser. No. 849,397, filed Aug. 12, 1969, and entitled TIRE AIR PRESSURE DETECTION AND SIGNALING DEVICE, filed by the present inventor, there is disclosed an apparatus for detecting leakage in a pneumatic tire by means of a flux field sensor. In this copending application, the inside of a pneumatic tire is provided with a flux-affecting material. The position of this material within the tire changes the flux which reaches a flux field sensor, the position of the flux-affecting material within the tire being, in turn, determined by the pressure within the tire. Therefore, by observing the flux reaching the flux field sensor, the tire pressure may readily be determined.

The device described in the preceeding paragraph is the only known device in which tire pressure is monitored without direct pressure readings. There is, however, one minor drawback associated with the invention described in the above-referenced copending patent application. This drawback is that the flux field sensors must be positioned in such a manner that the distance between the flux-affecting material and the sensor is constant under normal operating conditions.

SUMMARY OF THE INVENTION

The present invention relates to a device useful in sensing pressure drops in a pneumatic tire. Unlike the invention described in the above-referenced copending U.S. Patent application, the present invention depends upon a radiation principle rather than a flux field principle. For this reason, in the present invention, there is no need for a precise spacial relationship between the pressure indicating source and the detection apparatus.

In the present invention, the stem of a pneumatic tire is fitted with a valve assembly containing a small quantity of radioactive material. One side of the valve assembly fits directly onto the stem of the associated tire, the other side of the valve assembly being maintained under a predetermined pressure.

During normal tire operation, the radioactive material remains housed within the valve assembly of the present invention. If, however, the pressure within the associated pneumatic tire drops below a predetermined pressure value, a seal is broken and the radioactive material escapes and pours into the body of the tire. The tire then emits radiation from the material housed therein, and this radiation is detected by any of a large number of radiation detecting devices, such as the Geiger-Mueller counter.

The instrument panel of the associated vehicle is equipped with visual and auditory indicating devices to show when the radiation sensing monitor receives a dose of radiation. Thus, from within the cabin of the vehicle, a dangerous pressure drop in a tire of said vehicle is readily discovered.

Since a very small dose of radiation can be detected by a Geiger-Mueller counter at several feet distance, the spacing between the tire and the detection device is not critical.

It is therefore one object of the present invention to provide a safety device for indicating leaks in pneumatic tires.

It is another object of the present invention to provide a leak detection system which functions accurately and without the necessity for precise positioning of individual components.

It is a further object of the invention to provide a leak detection system based upon the radiation principle, which system is capable of detecting leaks in any one or more of a plurality of pneumatic tires with but a single radiation detector.

These and other objects of the invention, as well as many of the attendant advantages thereof, will become more readily apparent when reference is made to the following description taken in conjunction with the accompanying drawings.

BRIEF DESCRIPTION OF THE DRAWINGS

FIG. 8 is a schematic illustration of the monitoring system of the present invention including a typical instrumentation panel for the associated vehicle;

FIG. 10 is a perspective view of a typical indicating panel for mounting in a vehicle equipped with the present invention.

DETAILED DESCRIPTION OF THE DRAWINGS

Figure 1:
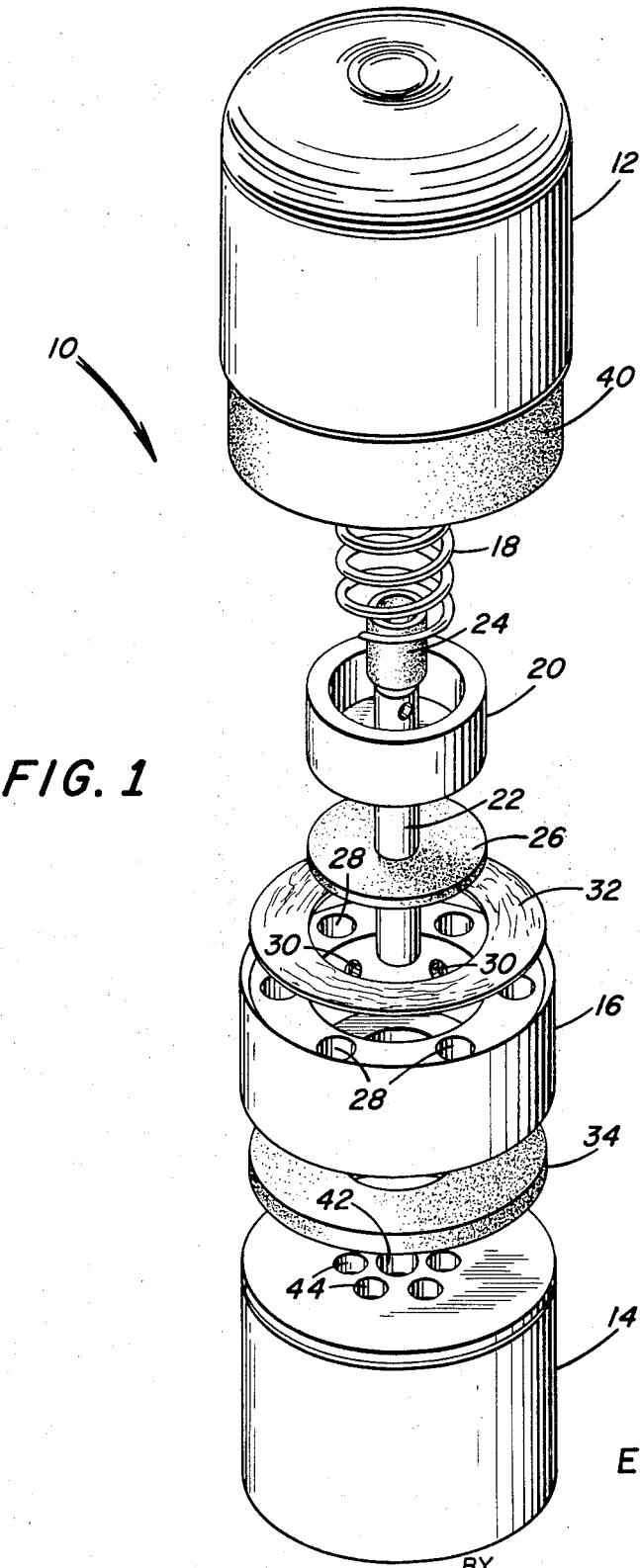
FIG. 1 is an exploded view of the valve assembly of the present invention.

With reference first to FIG. 1, the valve assembly of the present invention is shown generally at 10. The valve assembly 10 comprises, basically, a gas-tight upper case part 12, a lower case part 14, a piston 16 serving to house radioactive material, means for restraining the radioactive material within the piston 16 when tire pressure is at a safe level, and means for injecting the radioactive material into the tire when the pressure falls below a preset and safe level.

More particularly, the valve assembly 10 is constructed as follows. Abutting the upper portion of the upper case part 12 is a spring 18. The lowermost region of the spring 18 abuts a piston 20, which piston is integral with a hollow piston rod 22. Adapted to surround the upper region of the piston rod 22 is a rubber tube 24, and fitted around the lower portion of the piston rod 22 is a seal 26. The body of piston 16 is provided with a plurality of vertical bores 28 and a plurality of radial bores 30 suitable for housing a charge of radioactive material, and further suitable for providing a path for the radioactive material from the bores 28 and 30 into the pneumatic tire associated with the valve assembly. Above the piston 16, covering the bores 28 is a thin paper seal 32, and below the piston 16, adapted to seat on the lower case part 14, is a seal 34. The lower case part 14 is threaded at 36 and is provided, at the base of threads 36, with a seal 38. Finally, the valve assembly is provided with a liner 40 in the form of a cylinder. The top of the lower case part 14 is provided with an opening 42 through which the piston rod 22 passes and a plurality of openings 44 allowing the free flow of air into the piston region, or the passage of radioactive material from the housings 28 and 30 into the tire.

As noted above, vertical bores 28 and radial bores 30 define a plurality of chambers serving to house the charge of radioactive material employed in the leak detection system of the present invention. These chambers are lined in such a manner that when the radioactive material is housed therein, no radiation is allowed to pass outside the valve assembly. This may be accomplished by means of lead liners.

The radioactive material stored in the chambers may be of many types. For example, the material may be $Na_2U_2O_7 \cdot 6H_2O$; $UO_2(C_2H_3O_2)_2 \cdot 2H_2O$; $UO_2(NO_3)_2 \cdot 6H_2O$; or $UO_2SO_4 \cdot 3H_2O$. Naturally, other than the above materials may be used. With these materials and a typical Geiger-Mueller counter, a trace of radiation may be detected at a distance of several feet.

Figure 2:
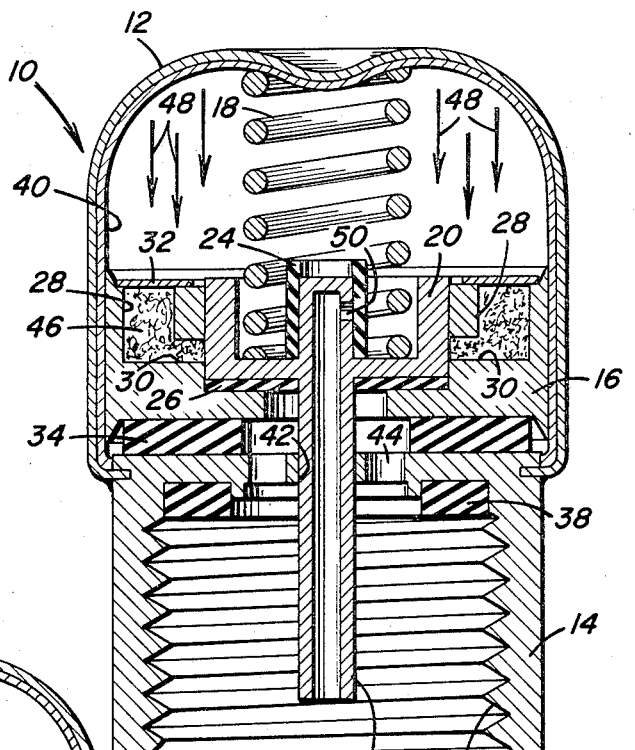
FIG. 2 is a cross-section of the valve assembly before insertion on a standard pneumatic tire valve.

With reference now to FIG. 2, the valve assembly 10 is shown before insertion on the stem associated with a typical pneumatic tire. In preparation for its use, the upper case part 12 of the valve assembly 10 is filled with an inert gas at a predetermined pressure. The inert gas is injected through the hollow piston rod 22 and enters the interior of the case part 12 by means of a bore 50 in the piston rod 22. After the predetermined pressure is reached, the rubber tube 24 is inserted (by means not shown) over the upper portion of the piston rod 22 so that the rubber tube 24 covers the opening 50. The pressure within the upper case part 12 exerts a force, in the direction of arrows 48, on the piston 20, urging the piston 20 against the seal 26 which, in turn, is forced against the piston 16. The force acting in the direction of arrows 48 also acts directly on the piston 16, urging said piston against the seal 34, the seal 34, in turn, abutting the bottom of the cylindrical liner 40. The spring 18 serves, also, to maintain the seals and pistons in the position as described above.

The vertical bores 28 and the radial bores 30 in the piston 16 are filled with a radioactive material 46. The paper seal 32 covers the tops of bores 28, and since there is no gas flow from the upper case part 12 to the lower case part 14, the paper seal 32 remains unbroken and the radioactive material 46 remains housed in their chambers, defined by respective sets of bores 28 and 30.

The valve, manufactured and pressurized as described with reference to FIG. 2, is then shipped to the ultimate consumer. Once a vehicle is provided with a radiation sensing device, or devices, the pneumatic tires are ready to be equipped with valve assemblies constructed in accordance with the present invention. Once a vehicle is provided with radiation sensors, the provision of the inventive leak detection means involves simply screwing the valve assembly, hereindescribed, onto a standard valve stem.

Figure 3:
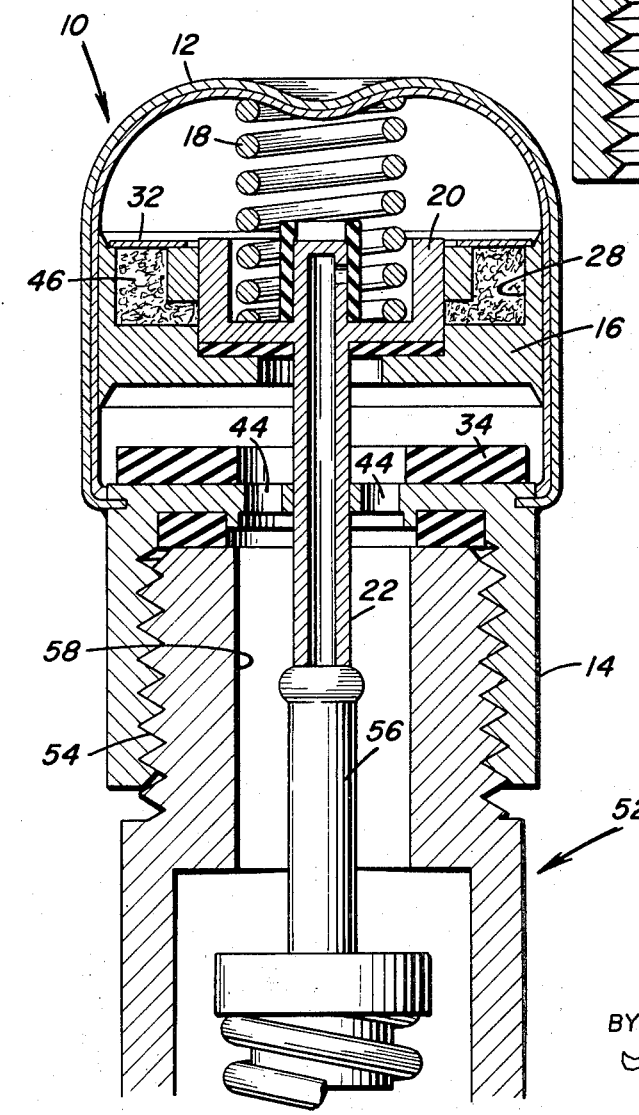
FIG. 3 is a cross-section of the valve assembly positioned on a standard pneumatic tire valve, the tire pressure being at a safe level.

With reference now to FIG. 3, the radiation-type leak detecting valve assembly of the present invention is mounted on a standard tire valve shown generally at 52. The tire valve does not form a part of the present invention and thus will be described only as required for an understanding of this invention. As is well known, the valve 52 is threaded at 54. The standard valve stem 56 is spring biased upwardly and extends into a hollow 58 at the uppermost part of the valve 52.

When the lower case part 14 is screwed onto the stem of the valve 52, the piston rod 22 exerts a force on the valve stem 56 and causes said valve stem to move downwardly, thereby opening the valve 52. Once the valve 52 is opened, a balancing of forces occurs. The piston rod 22 is forced downwardly by means of the spring 18 and the pressure within the upper case part 12. On the other hand, the pistons 16 and 20 are urged upwardly by the air pressure originating within the pneumatic tire and passing through the open tire valve 52. Naturally, then, the pressure within the upper case part 12 must be adjusted to meet the requirements of a particular pneumatic tire. With high pressure pneumatic tires, there must be a high pressure in the case part 12, while with low pressure pneumatic tires, a lower pressure in the upper case part is adequate.

As shown in FIG. 3, a proper force balancing exists when the unit 10 exerts sufficient forces to cause a downward movement of the valve stem 56, thereby opening the valve 52, and when the pneumatic tire exerts sufficient forces to cause the pistons 16 and 20 to remove themselves from seal 26 and slide upwardly along the liner 40. When this equilibrium condition exists, the paper seal remains unbroken and the bores 28 and 30, associated with the piston 16, are sealed by the piston 20 so that the radioactive material is restrained against passing into the pneumatic tire.

Figure 4:
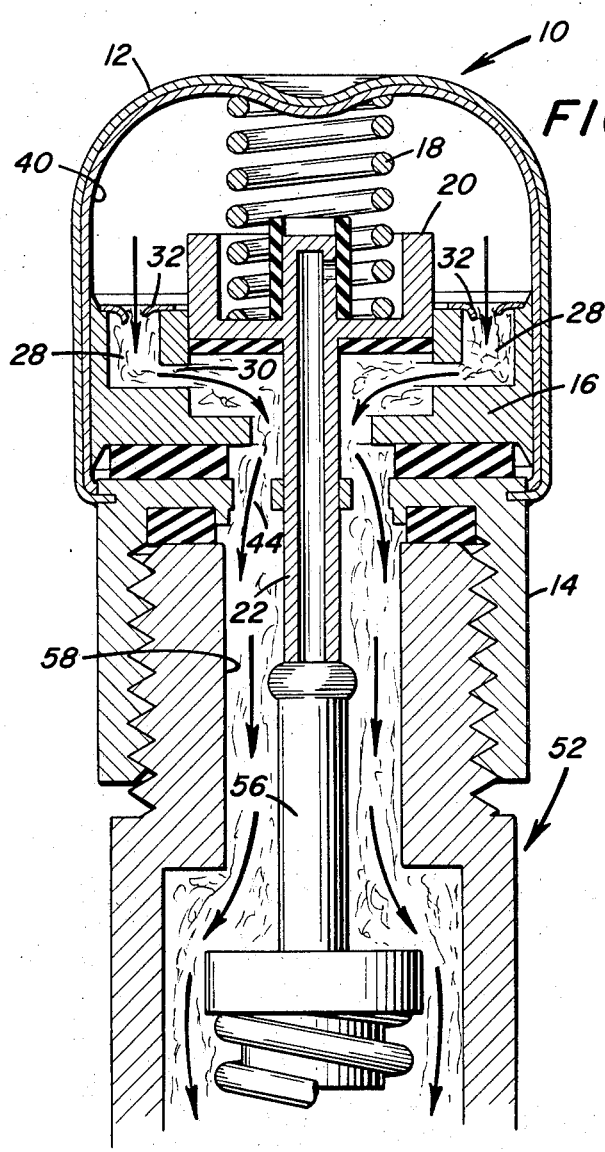
FIG. 4 is a cross-section of the valve assembly when the tire pressure is below a preset and safe level.

In FIG. 4, the valve assembly 10 of the present invention is shown in its position when the pressure in the pneumatic tire falls below a preset and safe level. When such is the case, the total of the forces exerted by the spring 18 and the upper case part 12 exceeds the force exerted by the pneumatic tire on the pistons 16 and 20. Thus, the piston 16 slides downwardly on the liner 40 and removes the bores 30 from the piston 20. In this manner, the weak paper seal 32 breaks and the inert gas housed within the chamber 12 propels the radioactive material 46 from bores 28 and 30 through the openings 44 and into the pneumatic tire. Once the pneumatic tire is flooded with radioactive material, the tire begins to radiate gamma rays (alpha and beta radiation being too weak to penetrate the tire). The gamma ray emission is detected by means of radiation detectors, to be described below, and the radiation phenomenon is displayed by means of an instrument panel, also described below.

Figure 5A:
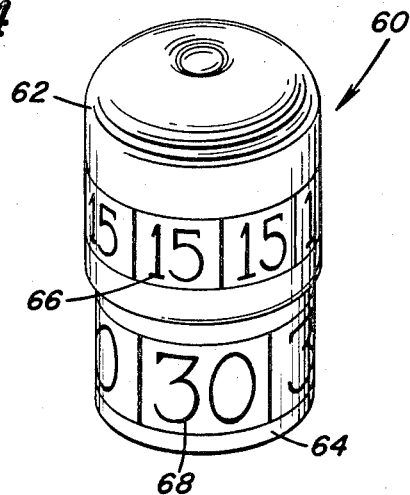
FIGS. 5a, 5b and 5c are perspective views of typical valve assemblies for 30 pound, 70 pound and 160 pound tires, respectively.
Figure 5B:
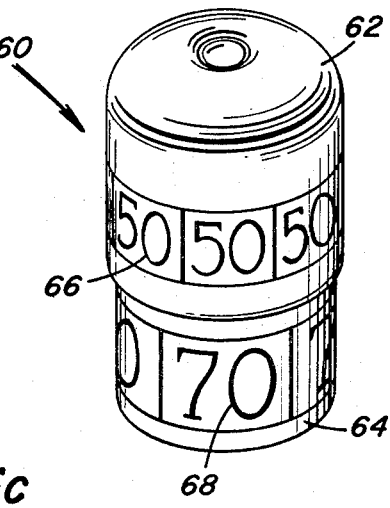
Figure 5C:
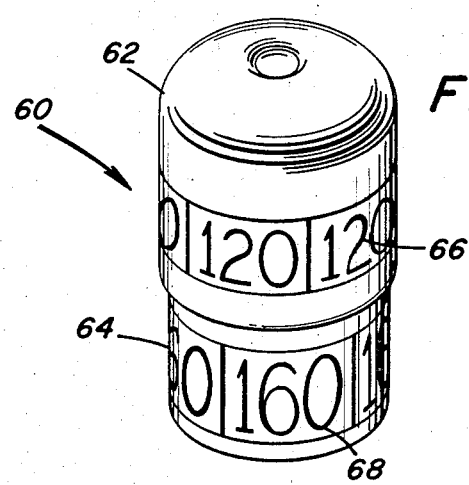

In FIGS. 5a, 5b and 5c, there are shown three valve assemblies as they may appear when ready for insertion on pneumatic tires. The valve assemblies are shown generally at 60, having an upper region 62 in which the upper case part 12 (of FIG. 1) is enclosed and a lower region 64 in which the lower case part 14 (of FIG. 1) is enclosed. The upper region 62 has provided thereon a plurality of numerals 66, while the lower region 64 has a plurality of numerals 68. The numerals 66 are indicative of the desired pressure in the upper case part 12 and the lower numerals 68 are indicative of the proper tire pressure. Therefore, in FIG. 5a, the valve assembly is intended for use on a pneumatic tire whose pressure is on the order of 30 pounds, and the proper pressure for the upper case part 12 is shown to be 15 pounds. Similarly, in FIG. 5b, there is shown a valve assembly for use on a 70 pound tire wherein the upper case part 12 is properly pressurized at 50 pounds. And, in FIG. 5c, the valve assembly 60 is intended for use on a tire whose proper inflation level is 160 pounds, the proper pressure for the upper case part 12 being 120 pounds.

Figure 6:
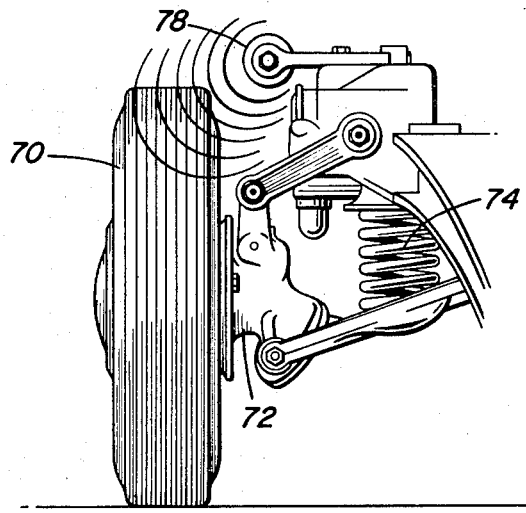
FIG. 6 is a front view of a vehicle tire showing the position of a radiation sensor used in association with the present invention.

As noted above, when the tire pressure falls below a predetermined value, the working parts move into the positions shown in FIG. 4 and the radioactive material 46 floods the pneumatic tire. As also noted above, when the radioactive material is in the tire, alpha particles are emitted. In FIG. 6, there is shown a typical front wheel and tire of an automobile or truck wherein the frame of the automobile or truck is provided with a radiation detecting device. The pneumatic tire is shown at 70 and is connected, in a well known manner, to an axle 72. A conventional front wheel spring 74 is provided and is attached to a frame member 76 and to the axle 72. The numeral 78 indicates a radiation detection device.

The detection device 78 is shown to be mounted near the tire 70; however, it will be noted that the device may be mounted at any position within the range of detection capabilities. The detection device 78 may take many forms. For example, the device may be a standard Geiger-Mueller counter. Since the detection device does not form a part of the present invention, a specific device is not here described with particularlity.

Figure 7:
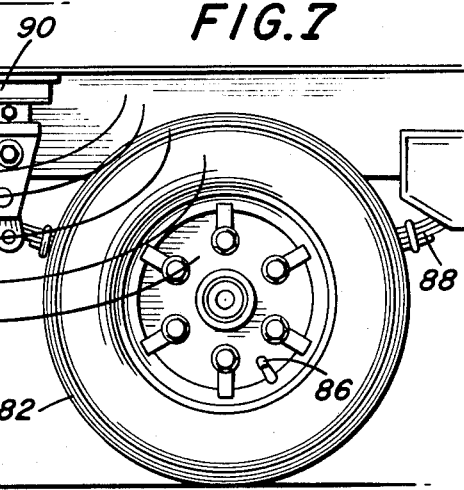
FIG. 7 is a side view of the rear wheels of a multi-wheel truck showing the position of a single radiation detector for monitoring a plurality of tires.

With reference to FIG. 7, there is shown a single radiation detection device serving to monitor a plurality of pneumatic tires. More particularly, FIG. 7 shows a pair of tires 80 and 82 equipped with valve assemblies constructed in accordance with the present invention. The valve assemblies are shown generally at 84 and 86, respectively.

Pneumatic tires 80 and 82 are of the type which appear on standard multiple tire trucks. A pair of leaf springs 87 and 88 support the tires 80 and 82. Mounted intermediate the tires 80 and 82 is a radiation detection device 90. Since the radiation detector is not required to be at a fixed distance with respect to the tire under observation, a single detector 90 may serve numerous tires. As noted above, the radiation expected to be emitted from a particular tire travels at least within a range of several feet. Therefore, there are numerous positions for mounting the radiation detector 90.

With respect now to FIG. 8, a schematic of the interconnection between a plurality of radiation sensors and an instrumentation panel in the cabin of an associated vehicle is shown. Assuming that the four radiation sensors are provided in a four-wheeled vehicle, radiation detector 92 represents the detector associated with the left front wheel of a vehicle. Radiation detector 94 is associated with the right front wheel, sensor 96 with the left rear wheel and sensor 98 with the right rear wheel.

It is here assumed that the radiation sensors are of the bismuth-tube variety. Therefore, a source of high voltage must be applied for proper radiation readings. A switch, shown generally at 100, serves to route high voltage signals to the individual radiation detectors 92 through 98. A high voltage power supply 102 feeds high voltage to the switch 100 via a high voltage conductor 104. The central rotating contact 106 of the switch 100 rotates at a rate of approximately one revolution per minute and wipes across fixed contacts 108, 110, 111, and 112, in that order. Contacts 108 through 114 are associated, respectively, with radiation sensors 92 through 98.

Connected to the fixed contacts 108 through 114 are a plurality of conductors 116 through 122, respectively. The conductors 116 through 122 are connected at their one ends to the respective contacts 108 through 114 and at their other ends to radiation sensors 92 through 98. When the rotary contact 106 is in the position shown, for example, in FIG. 8, in agreement with stationary contact 110, a high voltage signal from the power voltage source 102 travels to the radiation sensor 94 via the conductor 104, the rotary contact 106, the stationary conductor 110 and the conductor 118. If the right front wheel is at a pressure below a predetermined safe pressure, the sensor 94 sends a signal to a sensor amplifier 124, which, in turn, activates one or more indicators on an instrumentation panel 126. If, however, all pneumatic tires are at a safe pressure, the instrument panel 126 remains mute. The sensors 92 through 98 send signals to the sensor amplifier 124 by means of conductors 128 through 134.

Figure 9:
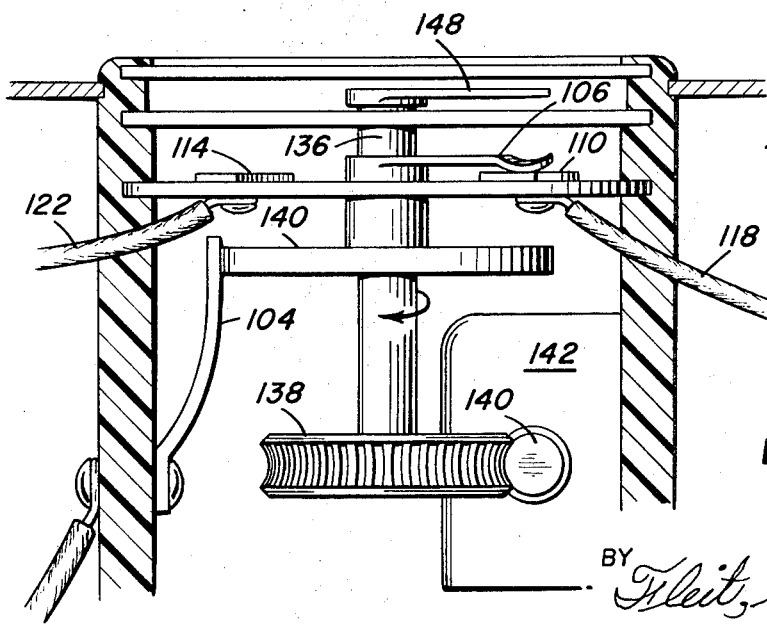
FIG. 9 is a side view of the sliding contact dial shown in FIG. 8.

In FIG. 9, the details of switch 100 are illustrated. The movable contact 106 is mounted on a shaft 136 integral with a gear 138. Gear 138 meshes with a threaded shaft 140, rotatably driven by a motor 142. The interconnection of elements 138 and 140 are of the type found in standard worm gear drives. High voltage is impressed upon the switch 100 by means of conductor 104 connected to a slide contact 144. The slide contact 144 is adapted so as to receive a high voltage signal from the conductor 104 and to transmit the high voltage signal to the sliding contact 106.

In FIG. 10, there is shown a typical instrumentation panel located in the cabin of a vehicle equipped with the leak detection system of the present invention. The instrumentation panel is shown generally at 146 and contains the switch 100 which is adapted to indicate the tire immediately under inspection. That is, a pointer 148 is provided in such a manner that the driver of the vehicle, upon inspection of the switch 100, is immediately aware of the particular tire being examined. Since the rotary switch 100 operates at one revolution per minute, there is sufficient time, upon the indication of a leak, for the driver to immediately become appraised of which tire is actually leaking. The panel 146 further comprises a meter 150, which meter indicates the radiation experienced by the radiation sensors. The meter is set up, in this example, so that the high numbers indicate proper pressures and the lower numbers indicate improperly low pressures. A red warning light 152 may also be provided on the instrumentation panel 146, as well as a small speaker below the grating 154, so that when one of the sensors detects a radiation, a light may be flashed and a buzzer may be sounded to alert the driver as to the immediate danger of a leaking tire.

Above, there has been described a preferred embodiment of the present invention. It should be understood, however, that this embodiment was described for illustrative purposes only and that many alterations and modifications may be practiced by those skilled in the art without departing from the spirit and scope of the invention. For example, several radiation fillings have been disclosed. It is, however, possible to employ different fillings than those specifically described. In addition, a particular placement for the detection sensors has been disclosed. Again, however, numerous other positioning methods may be employed. Still further, a specific piston and seal arrangement has been described, but numerous equivalent configurations may be employed. It is the intent, therefore, that the present invention not be limited by the above, but be limited only as defined in the appended claims.

What is claimed is:

1. A valve assembly adapted to be secured to a standard pneumatic tire and to serve as a leak detecting device, the valve assembly comprising: means for securing the valve assembly to the stem of a conventional pneumatic tire; means for opening the valve in the conventional pneumatic tire so that the air pressure within the tire communicates freely with said valve assembly; a charge of radioactive material insulatingly housed within said valve assembly; means for maintaining said radioactive material within said valve assembly when tire pressure is safe; means for injecting said radioactive material into said pneumatic tire when the air pressure in said pneumatic tire falls below a predetermined level to disperse said radioactive material throughout the tire; and a radiation detection device to detect the disposal of said radioactive material.

2. The assembly of claim 1, wherein said means for maintaining said radioactive material within said valve assembly and said means for injecting said radioactive material into said pneumatic tire comprise: a piston slidable within the housing of said valve assembly, said piston serving to house said radioactive material; pressure means for forcing said piston toward said valve of the standard pneumatic tire, said pressure means exerting a pressure less than the safe pressure required in said pneumatic tire; and a passageway for allowing the pressure within said pneumatic tire to force said piston away from the valve of said tire.

3. The valve assembly of claim 1 and further comprising: first piston means; a piston rod integral with said first piston means, said piston rod serving to engage the valve stem in a standard valve of a conventional pneumatic tire; spring means biasing said first piston means and said piston rod toward said valve stem; second piston means slidable with respect to said first piston means, said second piston means housing a radioactive material; means for exerting a pressure on said second piston means to force said second piston means toward the valve of said pneumatic tire; and a passageway to allow the pressure within said pneumatic tire to communicate with said second piston means to urge said second piston means in a direction away from the valve of said pneumatic tire.

4. The valve assembly as recited in claim 1, in combination with means to visually or audibly display dangerous conditions when the pressure in a pneumatic tire becomes low.

5. The combination of claim 4, including at least another conventional pneumatic tire with another said valve assembly attached thereto and another said detection device in combination therewith, said display means including a rotating contact selectively and consecutively actuating said radiation detection devices and indicating which of said pneumatic tires is low in pressure.

6. The value assembly of claim 1, wherein the radioactive material remains in its housing or is expelled into the pneumatic tire, depending upon a balancing of forces between the valve assembly itself and the pressure within the pneumatic tire.

7. The assembly of claim 1, wherein said valve opening means has a bore therein in fluid communication with and for providing pressure to said means for injecting said radioactive material into said pneumatic tire.

* * * * *